(No Model.)

J. W. JOHNSON.
HARNESS NECK PAD.

No. 374,189. Patented Dec. 6, 1887.

WITNESSES
F. G. Fischer
C. Mason

INVENTOR
John W. Johnson
By J. C. Higdon
Attorney.

UNITED STATES PATENT OFFICE.

JOHN W. JOHNSON, OF MAPLETON, KANSAS.

HARNESS NECK-PAD.

SPECIFICATION forming part of Letters Patent No. 374,189, dated December 6, 1887.

Application filed September 1, 1887. Serial No. 248,457. (No model.)

*To all whom it may concern:*

Be it known that I, JOHN W. JOHNSON, of Mapleton, Bourbon county, Kansas, have invented a new and Improved Harness Neck-Pad, of which the following is a full, clear, and exact description, reference being had to the accompanying drawings, forming a part hereof.

The object of my invention is to provide a pad for engaging the neck of the animal at a point that is in advance of the collar, and that will carry the weight that is usually imposed upon the collar, and, in addition, carry the weight of the collar itself when so desired.

My invention consists in a suitable supporting-strap which is arranged to encircle the neck of the animal, carrying loops or straps by means of which it is coupled to the hames, in combination with a suitable pad which is located on the animal's neck in front of the collar, and which is adapted to carry the weight of the supporting-strap and the collar, and suitable connections between the tongue or pole of the vehicle and the supporting-strap, substantially as hereinafter set forth, and pointed out in the claims.

Figure 1:
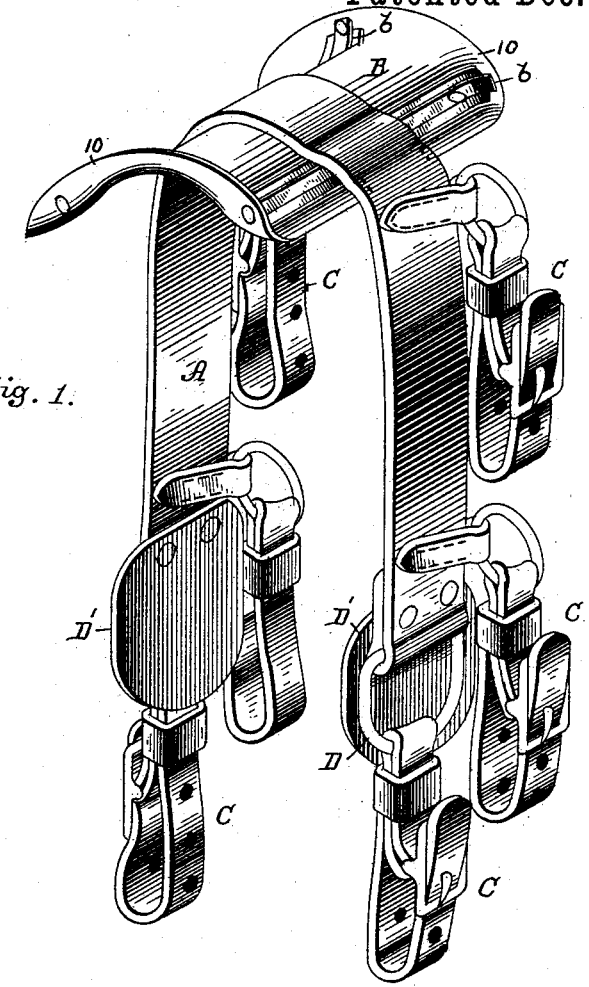
Figure 2:
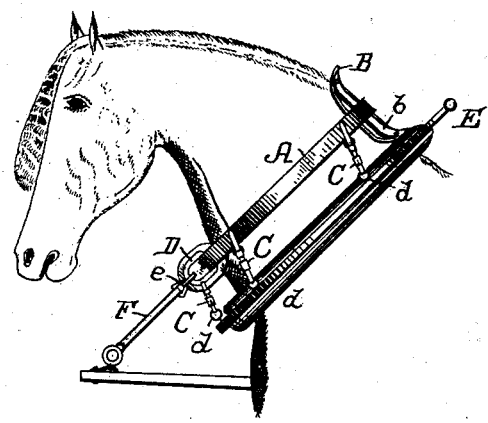

In the drawings, which illustrate the manner of carrying out my invention, Figure 1 is a perspective view of the improved pad, and Fig. 2 is a side view showing the pad in proper position for operation upon a horse in double harness.

A indicates the supporting-strap, which is arranged to encircle the neck of the horse, attached at about the middle of its length to pad B, and which carries a number of loops or straps, C, projecting from a common edge of said strap, and by means of which it is connected to the harness-hames E, said loops engaging the hame rings $d$, as shown. The lower ends of supporting-strap A are provided with rings D, to which breast-strap F or other connection between the tongue or pole of the vehicle is attached by means of snap-hooks or similar devices, such as $e$. In this connection I may say that although my invention is designed more particularly for use in double harness, yet it should be clear that it may be used in single harness by attaching the connections for supporting the shafts to the rings D in some way.

Any desired number of the loops C can be used for coupling the strap A to the hames, and for better connection I prefer to make use of an additional loop C, which connects the lower portion of the hames with rings D, as shown.

Leather shields D' are attached to lower ends of strap A, and thereby protect the animal's neck from chafing by contact with rings D.

It will be noticed that the pad B is provided with upwardly-curved ends 10, and that it is also arranged with longitudinally-disposed strengthening-ribs $b$, which are preferably made of steel, so as to possess the necessary strength, and at the same time be somewhat flexible.

In operation the loops C may be so adjusted as to lift the entire weight of the collar and the hames supporting it from pad B, thereby giving any chafed spot a chance to heal; or the weight can be disposed equally on pad B and collar by suitably adjusting said loops.

Having thus described my invention, what I claim is—

1. A neck-pad, substantially as herein described, consisting in a supporting-strap arranged to encircle the neck of the animal, carrying loops or straps by means of which it is coupled to the hames, and carrying rings at its ends, in combination with a pad which is located on the animal's neck in front of the harness-collar, and which is adapted to carry the supporting-strap and the weight of the collar and hames, and a breast-strap or analogous device which is attached to the rings at the lower ends of said supporting-strap, substantially as described.

2. The supporting-strap A, having loops C attached to one edge, and carrying rings D at its lower ends, in combination with pad B, substantially as described.

In testimony whereof I affix my signature in presence of two witnesses.

JOHN W. JOHNSON.

Witnesses:
T. B. HUDSFITH,
J. R. POLLARD.